3,087,872
ELECTROLYTIC CAPACITOR AND METHOD FOR PRODUCING SAME
Walter J. Bernard, Williamstown, Mass., assignor to Sprague Electric Company, North Adams, Mass., a corporation of Massachusetts
No Drawing. Filed Sept. 15, 1960, Ser. No. 56,096
5 Claims. (Cl. 204—39)

The present invention relates to electrolytic capacitors, and more particularly to a method of forming thin non-hydrated barrier films on electrolytic capacitor electrodes. More specifically this invention relates to electrolytic capacitors employing aluminum anodes and to a method of forming a porous and adherent alpha-alumina film having a second dense oxide film in the pores of the alpha-alumina.

For years, aluminum oxide films have been formed for a variety of purposes in the electronics art. Relatively dense non-porous films of anodically formed alumina have long been recognized for their excellent dielectric characteristics. Gamma-alumina, produced by anodic oxidation at 100–700 volts using "barrier type" electrolytes such as aqueous solutions of boric or tartaric acid, is most widely used in the capacitor art. Certain disadvantages arise out of the use of gamma-alumina films as dielectric however, especially during storage of capacitor units utilizing these films. Such capacitors show marked electrical deterioration over relatively short periods of time in storage. This electrical deterioration, namely large increase in series resistance, decrease in capacity, and increase in leakage current is often caused by hydration of the gamma-alumina film.

Existence of a non-hydratable polymorph of alumina has been known in the art for many years. But because of difficulties inherent in the anodic formation, and because of its electrical properties, alpha-alumina was deemed virtually useless as a capacitor dielectric. Through the concept of the present invention it is possible to make capacitors having excellent electrical characteristics with a substantially non-hydrated dielectric.

It is an object of this invention to overcome the foregoing and related disadvantages of the prior art.

It is a further object of the present invention to overcome the difficulties of anodically forming alpha-alumina on high purity aluminum, and to produce a barrier oxide film by forming a second film in the interstices of the alpha-alumina film, this duplex film being outstandingly suited for incorporation in an electrolytic capacitor by virtue of its advance over films known to the prior art.

Further objects of the invention as well as the advantages of it will become apparent from this specification as well as the appended claims.

Briefly, the above objects are achieved by first oxidizing the surface of an aluminum electrode in a bath of molten salt capable of producing a thin layer of porous non-hydrated alpha-alumina adhering to the aluminum anode, and then forming in the pores of the first oxide a second dense adherent oxide using for the second formation a conventional "barrier type" electrolyte such as boric or tartaric acid.

Further objects of this invention are achieved by incorporating the resulting anode having the substantially non-hydrated dielectric with porous spacers and a cathode foil to produce, upon impregnation with a suitable working electrolyte, an electrolytic capacitor capable of remaining substantially unchanged in electrical impedance even when stored for extended periods in a humid atmosphere.

A number of salts when molten are suitable for formation of alpha-alumina. In the practice of this invention it has been discovered that only salts with oxygen-containing anions, and particularly sulfate anions, are capable of forming the alpha-aluminum oxide in the molten state. Although the mechanism of the oxidation is not completely understood at this time, it is believed that the molten salt anion must be reduced in such a manner that it gives up its oxygen to the aluminum anode. Another important practical restriction must be placed on the choice of the proper salt for formation of alpha-alumina; the salt should be fusible between the temperatures of 145° and 245° C. since the best dielectric properties of the film are developed when anodic formation is carried out in this temperature range. Theoretically any salt or salt mixture melting below the melting point of pure aluminum might be used, but forming alumina at temperatures much above 245° C. is unsuccessful because leakage currents through the oxide film are greatly enhanced. This leakage is at least partially attributable to increased ionic conduction through the alumina which occurs at high temperatures.

Specific examples of salts particularly useful in forming alpha-alumina films are bisulfates of potassium and ammonium. Sodium bisulfate is not useful by itself, since its melting point is greater than 315° C. and since it is easily hydrated. But mixtures of sodium bisulfate with potassium or ammonium bisulfates are useful for this anodization where such mixtures melt in the range of temperatures between 145°–245° C.

Mixtures of other inorganic sulfates are also contemplated for the practice of this invention where such mixtures yield melting points which are in the desired range of temperature, i.e. between 145° and 245° C.

It is to be understood that the films formed by anodization in the above mentioned salts and salt mixtures need not consist solely and entirely of alpha-alumina to come within the concept of contemplated embodiments of this invention. Small amounts of gamma-alumina may also be formed concomitantly with the alpha-alumina, but the gross structure exhibits the properties expected of alpha-alumina. The film, as formed, is very hard and extremely porous. Solvents which readily attack aluminum, viz. sulfuric and hydrofluoric acids, and sodium hydroxide do not attack the film exhibiting characteristics of alpha-alumina.

The non-hydrated alpha-alumina film is not useful as a capacitor dielectric when it is removed from the molten salt electrolyte because its structure is relatively porous and thus a poor barrier film. The second step of the process, formation of the gamma-alumina in a "barrier type" electrolyte, converts this heretofore useless structure into a new and useful dielectric.

The following example illustrates one method of preparing the novel dielectric film of this invention.

A 99.99% purity aluminum anode 3 mils thick and 17.6 square centimeters in area (one side) is made the anode in a bath of ammonium bisulfate ($NH_4HSO_4$) molten at 150° C. The cathode is made from a strip of platinum having about the same shape and surface area as the aluminum anode. The anode is formed to 110 volts at a constant current density of 20 milliamperes per square. The anode is removed from the molten salt bath after 5 minutes at 110 volts and rinsed several times in distilled water. Leakage current through the resulting alpha-alumina film is too high at this point to permit measurement on the ordinary current leakage bridge.

The rinsed 110 volt anode is again made the anode, but this time in a cell utilizing a conventional "barrier type" electrolyte consisting of 25 weight percent ammonium borate salt dissolved in ethylene glycol solvent, the temperature of the cell being held at 25° C. After 100 volts has been impressed across the cell for 3 minutes and a very small amount of charge has passed, the leakage current is reduced to about 25 microamperes.

Treating the anodes formed according to the procedure recited above with boiling water for 5 minutes causes little change in the electrical characteristics of the film in contra-distinction to the large adverse change caused by such treatment on films formed by prior art methods. Series resistance of ordinary films increases as much as 12-fold when subjected to boiling water treatment, while resistance of the film of this invention increases only slightly. The large increase in resistance is directly attributable to hydration of gamma-alumina films, and causes capacitors having such films to lose their usefulness during storage in a humid atmosphere. Capacitors having the dielectric of this invention, namely the non-hydrating alpha-alumina, the interstices or pores of which are filled with dense non-porous gamma-alumina, do not lose their usefulness. Only this modicum of gamma-alumina in the interstices of the alpha-alumina is capable of hydrating, thereby permitting only a slight change in electrical characteristics.

The mechanical properties of the duplex anode film and the underlying aluminum are such that strips of the formed foil may be compacted and rolled with paper spacers and cathode foils into convolutely wound capacitance sections and impregnated with any conventional aluminum capacitor electrolyte to produce electrolytic capacitors in a fashion well-known to the art.

A working electrolyte useful in the practice of this invention consists of 50% by weight ethylene glycol, 20% by weight ammonium pentaborate, 4% by weight O-azo toluene, and the remainder water, as described in U.S. Letters Patent 2,757,140 to Francis H. Bush.

It is understood that many widely varying embodiments of this invention may be produced by one skilled in the art by utilization of well-known procedures or by application of individual technique without truly departing from the scope and breadth of the concept of this invention as defined in the claims.

What is claimed is:

1. A method of anodically producing an aluminum oxide dielectric film adhering to an aluminum electrode comprising the steps of firstly forming a porous substantially non-hydrated adherent film of alumina on said electrode by making the latter the anode in a bath of molten salt, said salt being selected from the class of low melting acid sulfates consisting of ammonium bisulfate and potassium bisulfate, and secondly forming a dense non-porous oxide film in the interstices of said porous film by making the surface-oxidized electrode the anode in a barrier type electrolyte.

2. A method of anodically producing an aluminum oxide dielectric film adhering to an aluminum electrode comprising the steps of firstly forming a porous substantially non-hydrated adherent film of alumina on said electrode by making the latter the anode in a bath of molten salt, said salt being a low melting mixture of acid sulfate salts selected from the class consisting of sodium bisulfate, ammonium bisulfate, and potassium bisulfate, and secondly forming a dense non-porous oxide film in the interstices of said porous film by making the surface-oxidized electrode the anode in a barrier type electrolyte.

3. A process for producing a duplex anodic film of alumina on an aluminum electrode, said duplex anodic film adhering to said aluminum and consisting essentially of alumina exhibiting the non-hydrated characteristics of alpha-alumina and having an interspersed modicum of dense non-porous alumina capable of being hydrated, such that said duplex film is a barrier dielectric layer, said duplex film being capable of hydration only to a slight degree relative to gamma-alumina film and capable of being changed in electrical resistance only by a small percentage of its original resistance when subjected to a humid atmosphere, said process comprising the steps of firstly forming a porous adherent substantially non-hydrated film of alumina on said electrode by making the latter the anode in a bath of a molten acid sulfate salt having a melting point between 145° and 245° C., and secondly forming a dense non-porous alumina in the interstices of said porous film in an electrolyte selected from the class consisting of boric and tartaric acids, said second formation being conducted at a temperature between 15°–50° C. while making the surface-oxidized electrode the anode in the bath.

4. A process as defined in claim 3 wherein said molten acid sulfate salt is a member of the class consisting of ammonium bisulfate and potassium bisulfate.

5. A process as defined in claim 3 wherein said molten acid sulfate salt is a mixed salt of members of the class consisting of ammonium bisulfate, potassium bisulfate, and sodium bisulfate.

References Cited in the file of this patent

UNITED STATES PATENTS

| | | |
|---|---|---|
| 2,666,023 | Schaaber | Jan. 12, 1954 |
| 2,905,600 | Franklin | Sept. 22, 1959 |
| 2,907,933 | Nazzewski | Oct. 6, 1959 |
| 2,917,683 | Brennan | Dec. 15, 1959 |
| 2,930,951 | Burger et al. | Mar. 29, 1960 |
| 3,002,900 | Henry et al. | Oct. 3, 1961 |

FOREIGN PATENTS

| | | |
|---|---|---|
| 397,538 | Great Britain | Aug. 21, 1933 |
| 509,915 | Great Britain | Oct. 18, 1937 |
| 644,887 | Great Britain | Oct. 18, 1950 |